United States Patent
Shu et al.

(10) Patent No.: US 9,197,124 B2
(45) Date of Patent: Nov. 24, 2015

(54) METHOD AND APPARATUS TO REDUCE OVERCURRENT DURING THE STARTUP OF A SWITCHING REGULATOR

(71) Applicant: Marvell World Trade Ltd., St. Michael (BB)

(72) Inventors: Biing Long Shu, Siglap (SG); Jinho Choi, Saratoga, CA (US); Jye Sheng Hong, Singapore (SG); Ravishanker Krishnamoorthy, Singapore (SG)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

(21) Appl. No.: 14/059,261

(22) Filed: Oct. 21, 2013

(65) Prior Publication Data

US 2014/0112035 A1    Apr. 24, 2014

Related U.S. Application Data

(60) Provisional application No. 61/717,862, filed on Oct. 24, 2012.

(51) Int. Cl.
| | | |
|---|---|---|
| *H02H 7/10* | (2006.01) | |
| *H02M 1/32* | (2007.01) | |
| *H02M 1/36* | (2007.01) | |
| *H02M 3/335* | (2006.01) | |
| *H02M 1/00* | (2007.01) | |

(52) U.S. Cl.
CPC ........ *H02M 1/32* (2013.01); *H02M 1/36* (2013.01); *H02M 3/33507* (2013.01); *H02M 2001/0009* (2013.01)

(58) Field of Classification Search
CPC .............. H02M 3/156–3/158; H02M 1/32; H02M 1/36; H02M 3/33507; H02M 2001/0009
USPC ............ 323/271, 282–285; 363/21.01–21.18
See application file for complete search history.

(56) References Cited

U.S. PATENT DOCUMENTS

| | | | |
|---|---|---|---|
| 5,747,977 A |  | 5/1998 | Hwang |
| 7,359,225 B2 |  | 4/2008 | Djenguerian et al. |
| 2007/0008748 A1 | * | 1/2007 | Tang .......................... 363/21.12 |
| 2010/0194367 A1 | * | 8/2010 | Lund et al. ..................... 323/284 |
| 2010/0194445 A1 | * | 8/2010 | Balakrishnan et al. ........ 327/108 |
| 2011/0149614 A1 | * | 6/2011 | Stracquadaini ............ 363/21.12 |
| 2011/0194315 A1 | * | 8/2011 | Gaknoki et al. ............ 363/21.17 |
| 2012/0163040 A1 | * | 6/2012 | Zhang et al. ............... 363/21.12 |
| 2013/0100714 A1 | * | 4/2013 | Zhang et al. ............... 363/21.17 |

FOREIGN PATENT DOCUMENTS

| | | |
|---|---|---|
| EP | 1870992 A1 | 12/2007 |
| JP | 2004-343870 A | 12/2004 |

OTHER PUBLICATIONS

Li Fuhua et al., "Design of an off-line AC/DC controller based on Skip Cycle Modulation", Integrated Circuits ISIC, Proceedings of the 2009 12th International Symposium, Dec. Dec. 16, 2009, pp. 228-231, Singapore.

International Search Report and Written Opinion for PCT/US2013/065973, filed Oct. 21, 2013.

* cited by examiner

*Primary Examiner* — Timothy J Dole
*Assistant Examiner* — Shahzeb K Ahmad

(57) ABSTRACT

A power supply apparatus includes an inductor to store and discharge energy and a circuit to charge the inductor using a plurality of charging pulses. The circuit skips a charging pulse of the plurality of charging pulses to reduce overcurrent associated with the inductor.

14 Claims, 6 Drawing Sheets

METHOD AND APPARATUS TO REDUCE OVERCURRENT DURING THE STARTUP OF A SWITCHING REGULATOR

CROSS REFERENCE TO RELATED APPLICATION

This present disclosure claims the benefit of U.S. Provisional Application No. 61/717,862, "METHOD TO REDUCE OVER CURRENT DURING THE START UP OF A SWITCHING REGULATOR," filed on Oct. 24, 2012, which is incorporated by reference herein in its entirety.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Switching regulators such as flyback regulators and buck regulators use an inductor to store energy in order to convert electrical power from one form into another form. Accordingly, regulators are sometimes referred to as converters. Switching regulators can be used to convert AC to Direct Current (DC) (AC DC regulators) or convert. DC to DC having a different voltage and/or polarity (DC-DC regulators).

Switching regulators that use an inductor to store energy operate by cycling between storing energy in the inductor (i.e., charging the inductor) and extracting energy from the inductor (i.e., discharging the inductor). The energy is stored. in a magnetic field of the inductor, which magnetic field is created by and is proportional to a core current flowing in the inductor. Energy is stored into the inductor by increasing the magnitude of the core current and thereby increasing magnetic field of the inductor. Similarly, extracting energy from the inductor requires decreasing the core current and thereby decreasing the magnetic field of the inductor.

SUMMARY

In an embodiment of the disclosure, a power supply apparatus comprises an inductor to store and discharge energy and a circuit to charge the inductor using a plurality of charging pulses. The circuit skips a charging pulse of the plurality of charging pulses to reduce overcurrent associated with the inductor.

In an embodiment, the circuit includes a switch coupled to the inductor and to a pulse width modulator (PWM) controller. The PWM controller outputs a first control signal to a control terminal of the switch to charge the inductor and a second control signal to the control terminal of the switch to skip the charging of the inductor.

In an embodiment, the circuit skips the charging pulse during a startup period, the startup period being determined using an output voltage of the power supply apparatus, an RC circuit, or a cycle count of the charging pulses.

In an embodiment, the PWM controller outputs the second control signal to skip the charging of the inductor based on an output voltage of the power supply apparatus.

In an embodiment, the circuit skips the charging pulse based on a duration of the charging pulse.

In an embodiment, the circuit is adapted to reduce overcurrent by skipping another charging pulse subsequent to the skipped charging pulse.

In an embodiment, a method performs applying a plurality of charging pulses to an inductor of a power supply apparatus to charge the inductor with energy, and skipping a charging pulse to reduce overcurrent associated with the inductor.

In an embodiment, the method applies a first control signal to a control terminal of a switch coupled to the inductor to charge the inductor and applies a second control signal to the control terminal of the switch to skip the charging of the inductor.

In an embodiment, the method performs skipping the charging pulse during a startup period. The method performs determining the startup period using a cycle count of the charging pulse, an output voltage of the power supply apparatus, or an RC circuit.

In an embodiment, the method performs skipping the charging pulse based on an output voltage of the power supply apparatus.

In an embodiment, the method performs skipping charging pulse based on a duration of the skipped charging pulse.

In an embodiment, the method performs skipping another charging pulse subsequent to the skipped charging pulse.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
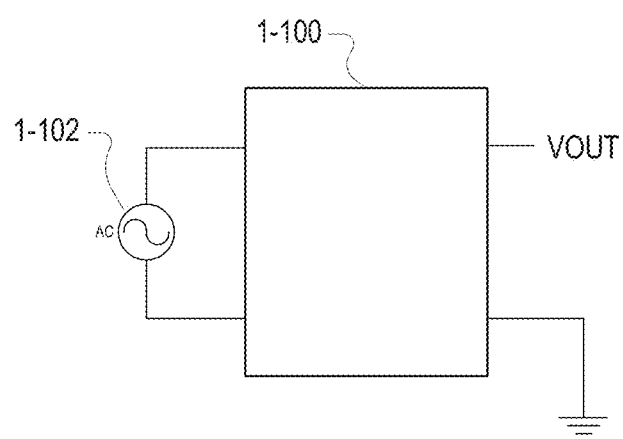
FIG. 1 shows a block diagram of a regulator.

FIG. 1 slows a switching regulator 1-100. Switching regulators such as flyback regulators and buck regulators use an inductor to store energy order to convert electrical power from one form, such as produced by Alternating Current (AC) source 1-102, into another form, such as output voltage VOUT. Accordingly, regulators are sometimes referred to as converters. Switching regulators can be used to convert AC to Direct Current (DC) (AC-DC regulators) or convert DC to DC having a different voltage and/or polarity (DC-DC regulators).

During the startup period of the switching regulator, an output voltage of the switching regulator may be low and may not be able to discharge the inductor as quickly as the switching regulator is charging the inductor. This causes the core current and magnetic field of the inductor to increase across successive charge/discharge cycles, thereby generating an undesirably large current is called. an overcurrent.

Figure 2:
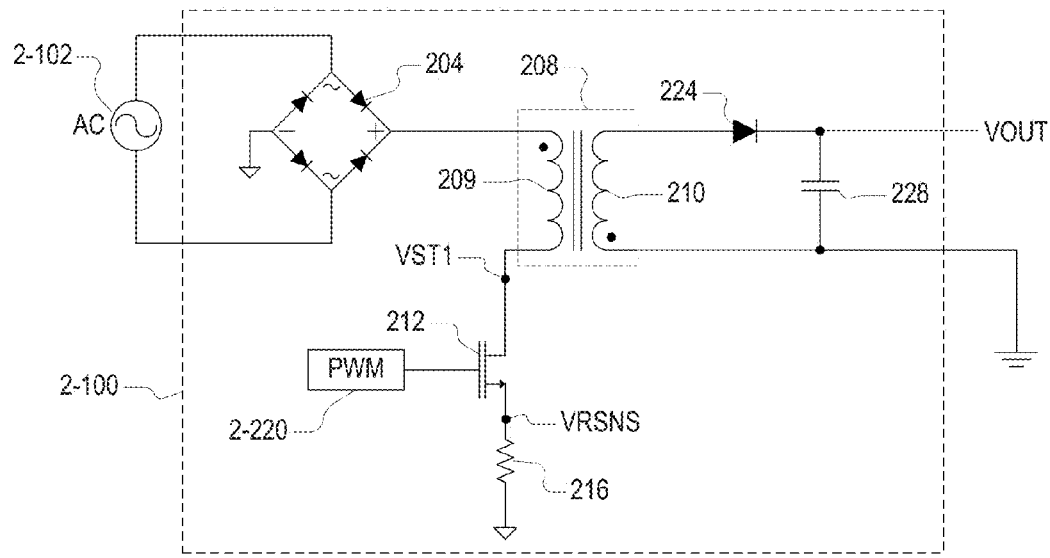
FIG. 2 is a schematic of a flyback regulator.

FIG. 2 is a schematic block diagram of a switching regulator 2-100 according to an embodiment. The switching regular 2-100 is an AC-DC flyback regulator that uses a flyback transformer 208 as an energy-storing inductor. Current from an AC source 2-102 is rectified by a bridge rectifier 204. The output of the bridge rectifier 204 is connected to a first terminal of a primary winding 209 of the flyback transformer 208. The flyback transformer 208 may be a magnetic core transformer with or without an air gap or may be an air core transformer.

The flyback transformer 208 comprises the primary winding 209 and a secondary winding 210. The primary winding 209 is used to store energy into the flyback transformer 208, i.e., to charge the flyback transformer 208. The secondary winding 210 is used to extract energy from the flyback transformer 208, i.e., to discharge the flyback transformer 208.

A first switched terminal of a switching device 212 is connected to a second terminal of the primary winding 209. The switching device 212 is shown as a Metal Oxide Semiconductor Field Effect Transistor (MOSFET), but may be a junction FET, bipolar junction transistor, insulated-gate bipolar transistor, or similar device or circuit. The switched device may be an N-type or P-type device and may be an enhancement or depletion mode device. The voltage at the first switched terminal of the switching device 212 is labeled as switch terminal voltage VST1.

A second switched terminal of the switching device 212 is connected to a current sense resistor 216. The voltage at the second switched terminal of the switching device 212 is the current sense voltage VRSNS and is proportional to the current flowing through the primary winding 209, switching device 212, and current sense resistor 216.

A control terminal of the switching device 212 is connected to a Pulse Width Modulation (PWM) controller 2-220. The PWM controller 2-220 operates at a cycle rate, and within each cycle may turn the switching device 212 on and then off. A person of ordinary skill in the art would understand, based on the disclosures and teachings provided herein, that a variety of structures and methods can be used to implement the PWM controller 2-220.

For example, the PWM controller 2-220 may include an integrated circuit comprising a microcontroller executing a computer program stored on a non-transitory computer-readable storage medium. The PWM controller 2-220 may also include an oscillator, Analog-to-Digital Converter (ADC), voltage reference, and/or a comparator. Furthermore, the switching device 212 and the PWM controller 2-220 may be integrated onto a single semiconductor chip or packaged together as a single semiconductor device.

A first terminal of the secondary winding 210 of the flyback transformer 208 is connected to an anode of a diode 224. A cathode of the diode 224 is connected to a first terminal of a capacitor 228. A second terminal of the secondary winding 210 of the flyback transformer 208 is connected to a second terminal of the capacitor 228. A voltage at the first terminal of the capacitor 228 is the output voltage VOUT. The capacitor 228 may be a polymer, ceramic, electrolytic, or other suitable capacitor.

Figure 3:
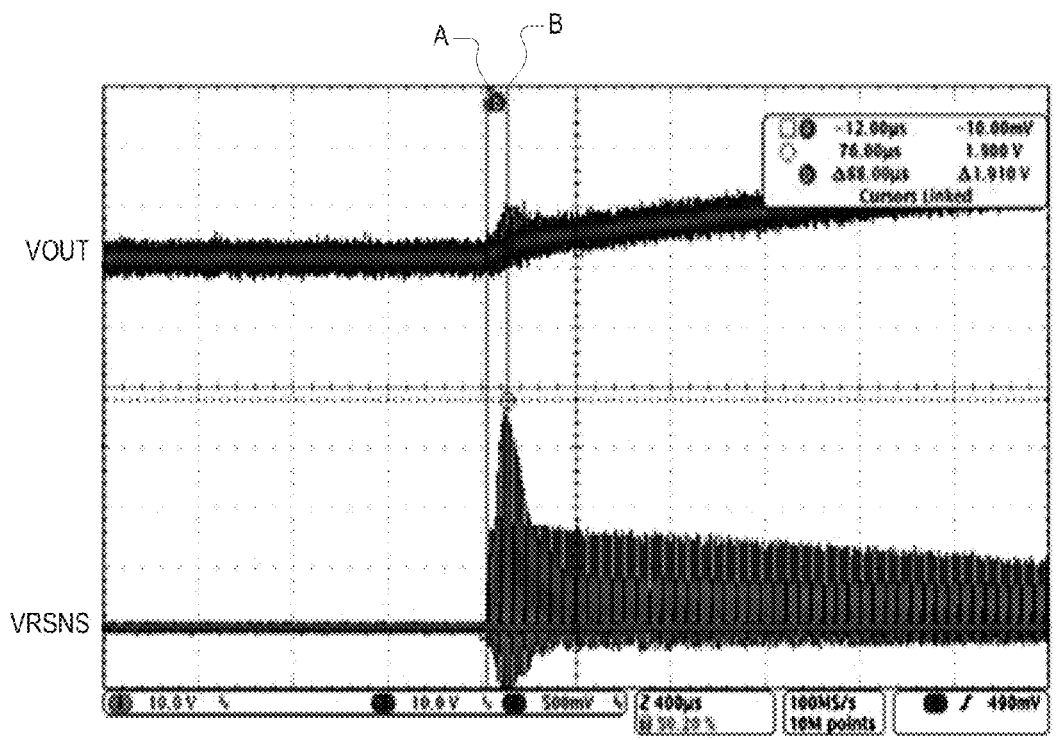
FIG. 3 shows waveform diagrams of signals relating to the flyback regulator of FIG. 2.

FIG. 3 illustrates an operation of the flyback regulator 2-100, and shows a screen capture from an oscilloscope showing output voltage VOUT and current sense voltage VRSNS. Initially the PWM controller 2-220 is not switching the switching device 212. Accordingly, output voltage VOUT is substantially zero volt, and the current through the primary winding 209, switching device 212, and current sense resistor 216 is also substantially zero, as shown by current sense voltage VRSNS being substantially zero volt.

At a time A indicated by a vertical line, the PWM controller 2-220 begins to repeatedly turn the switching device 212 on and off, generating charging pulses that charge flyback transformer 208. For example, the PWM controller 2-220 may use a 125 KHz cycle rate and may initially turn the switching device 212 on for 1 microsecond at the beginning of every cycle. When the switching device 212 is on, an increasing current flows through the primary winding 209, switching device 212, and current sense resistor 216, as shown by the pulse in current sense voltage VRSNS at time A. The increasing current flowing through the primary winding 209 causes energy to be stored in the flyback transformer 208.

When the PWM controller 2-220 turns the switching device 212 off, the current flowing through the primary winding 209, switching device 212, and current sense resistor 216 is reduced to substantially zero, as shown by VRSNS dropping to substantially zero volt. While the switching device 212 is off, the energy stored in the flyback transformer 208 discharges through a decreasing current in the secondary winding 210 and into the capacitor 228, which causes the output voltage VOUT to increase.

However, when the output voltage VOUT is small, only a portion of the stored energy in the flyback transformer 208 can be extracted during the period of time when the switching device 212 is turned off. This is limited by the slow discharging rate when the output voltage VOUT is small. Therefore, a portion of the stored energy in the flyback transformer 208, and a portion of the corresponding core current in the flyback transformer 208, remains when the switching device 212 is turned on next.

As a result, FIG. 3 shows that as the PWM controller 2-220 repeats the cycle of turning the switching device 212 on and then off, the successive current pulses through the primary winding 209, switching device 212, and current sense resistor 216 when the switching device 212 is on increase in magnitude, as shown by current sense voltage VRSNS in the region of FIG. 3 between time A and time B. Additionally, the high current through switching device 212 and current sense resistor 216 causes high voltage spikes to occur in switch terminal voltage VST1.

At time B, the output voltage VOUT has risen enough that the amount of energy being discharged from the flyback transformer 208 when the switching device 212 is off becomes equal to or greater than the amount of energy being stored into the flyback transformer 208 when the switching device 212 is on. Accordingly, the magnitude of the current pulses through the primary winding 209, switching device 212, and current sense resistor 216 when the switching device is on begins to decrease starting at time B, as shown by current sense voltage VRSNS in the region of FIG. 3 after time B.

Figure 4:
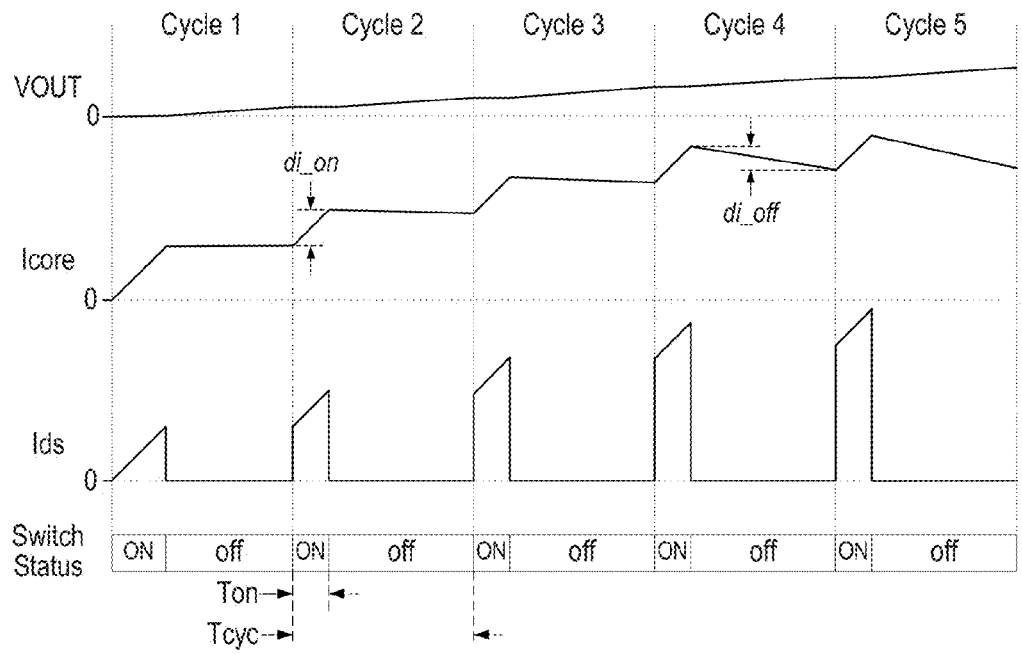
FIG. 4 is waveforms showing a startup current profile relating to the flyback regulator of FIG. 2.

FIG. 4 shows a startup current profile of the flyback regulator 2-100 of FIG. 2 using a startup sequence of the related art. The current through the switching device 212 is shown as Ids. The core current in the flyback transformer 208 is shown as Icore. A cycle time Tcyc is the inverse of the switching frequency of the PWM controller 2-220, e.g., if the switching frequency is 125 KHz, the cycle time Tcyc is 8 microseconds. An on-time Ton is the duration that the switching device 212 is on within a cycle. The status of switching device 212, that is, whether it is off or on, is shown as Switch Status. The PWM controller 2-220 outputs a first control signal to the control terminal of switching device 212 to turn the switching device 212 on.

The change in the core current Icore when the switching device 212 is on, the charged current di_on, is determined by Equation 1:

$$di_{on} = \frac{Vin}{L} \cdot Ton \qquad \text{Equation 1}$$

where Vin is the voltage across the primary winding 209 and L is the inductance of the primary winding 209.

The change in the core current Icore when the switching device 212 is off, the discharged current di_off, is determined by Equation 2:

$$di_{off} = \frac{N \cdot (VOUT + Vd)}{L} \cdot (Tcyc - Ton) \qquad \text{Equation 2}$$

where N is a turns ratio of the primary winding 209 to the secondary winding 210, L is the inductance of the primary winding 209, and Vd is a forward voltage of the diode 224. Because the discharged current di_off flows into capacitor 228 when the switching device 212 is off, the output voltage VOUT changes at a rate proportional to the discharged current di_off.

Because the output voltage VOUT is small during the first three cycles shown in FIG. 4, the magnitude of the discharged current di_off in those cycles is also small. As long as the discharged current di_off is smaller than the charged current di_on, the core current Icore increases across each cycle.

As the output voltage VOUT increases the magnitude of the discharged current di_off increases, as shown in cycle 4 of FIG. 4. When the output voltage VOUT reaches or exceeds a threshold Vo, the discharged current di_off equals or exceeds the charged current di_on. That is, when the output voltage VOUT is equal to or greater than the threshold Vo, the discharging rate of flyback transformer 208 equals or exceeds the charging rate. The threshold Vo is given by Equation 3:

$$Vo = \frac{Vin \cdot Ton}{N \cdot (Tcyc - Ton)} - Vd \qquad \text{Equation 3}$$

Once the output voltage VOUT reaches the threshold Vo, the core current Icore will no longer increase across successive cycles.

In an embodiment of the disclosure, pulse skipping is used to reduce the peak current that occurs during the charging of flyback transformer 208. That is, when the PWM controller 2-220 detects or predicts during startup that turning on the switching device 212 during a cycle would lead to overcurrent because of, for example, high core current Icore in the flyback transformer 208, the PWM controller 2-220 outputs a second control signal to the control terminal of the switching device 212 to skip turning the switching device 212 on during that cycle.

Figure 5:
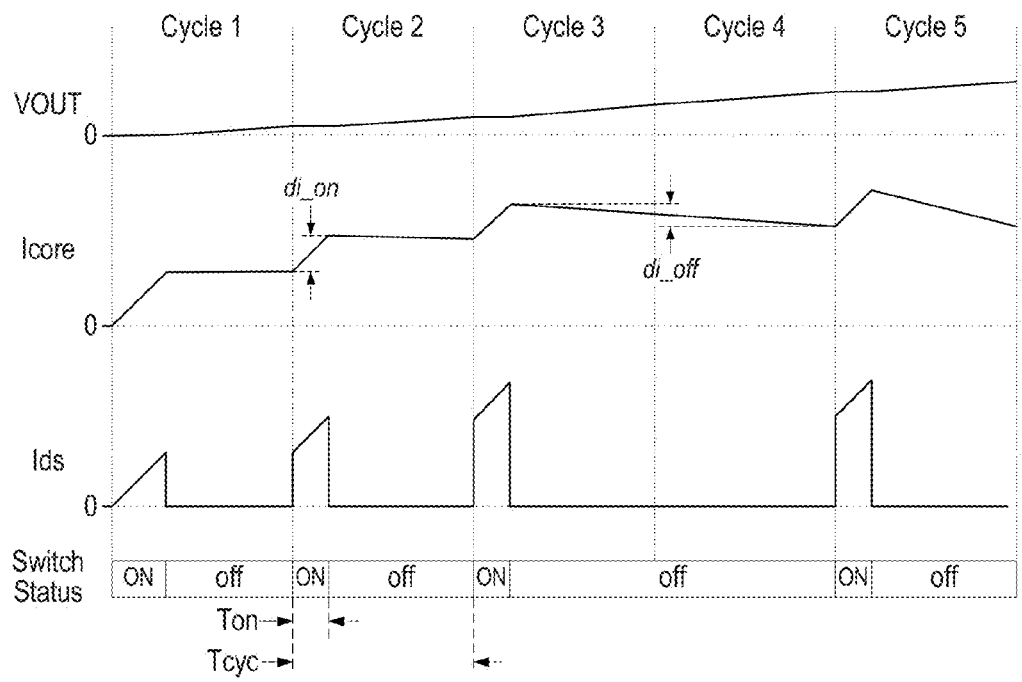
FIG. 5 is waveforms showing a startup current profile relating to the flyback regulator of FIG. 2 according to an embodiment of the disclosure.

FIG. 5 shows a startup current profile of the flyback regulator 2-100 according to an embodiment of the present disclosure. Cycle 4 of FIG. 5 demonstrates pulse skipping.

In an embodiment, the PWM controller 2-220 operates to detect or predict situations leading to overcurrents. The PWM controller 2-220 may detect or predict overcurrents by using one or more of the output voltage VOUT, the current sense voltage VRSNS, the current Ids through the switching device 212, a time since startup began, or the duration of the on-time Ton. For example, the PWM controller 2-220 may only predict an overcurrent when the output voltage VOUT is less than output threshold Vo given by Equation 5. In another example, the PWM controller 2-220 predicts an overcurrent when the on-time Ton is shorter than a particular value. In an embodiment, when the current Ids exceeds a predetermined current limit, the on-time Ton is terminated immediately, and accordingly the on-time Ton being less than a particular value, e.g., 800 nanoseconds, detects or predicts an overcurrent. The PWM controller 2-220 may also use information about the design of the flyback regulator 2-100 to detect or predict potential overcurrent.

Before the time when a charging pulse would be generated for cycle 4 of FIG. 5, the PWM controller 2-220 detects or predicts that charging the flyback transformer 208 during cycle 4 would produce an overcurrent. Accordingly, the PWM controller 2-220 does not turn the switching device 212 on during cycle 4, skipping the charging pulse that would otherwise have occurred in cycle 4.

Because the switching device 212 is off during cycle 4, the core current Icore continues to decrease as energy is discharged from the flyback transformer 208 through the secondary winding 210, so that the core current Icore is lower at the start of cycle 5 than it was at the start of cycle 4. Accordingly, because the flyback transformer 208 continues to discharge during cycle 4, the output voltage VOUT continues to rise during cycle 4.

Next, the PWM controller 2-220 determines that the reduction in the core current Icore during cycle 4 and/or the increase in the output voltage VOUT during cycle 4 allows further charging of the flyback transformer 208 without danger of an overcurrent. Accordingly, in cycle 5 the PWM controller 2-220 does not skip the charging pulse. Note, however, that if the PWM controller 2-220 detected or predicted that turning the switching device 212 on during cycle 5 would result in an overcurrent, the PWM controller 2-220 may skip the charging pulse in cycle 5 as well, and skip pulses in successive cycles until charging the flyback transformer 208 can resume without causing overcurrents.

Figure 6:
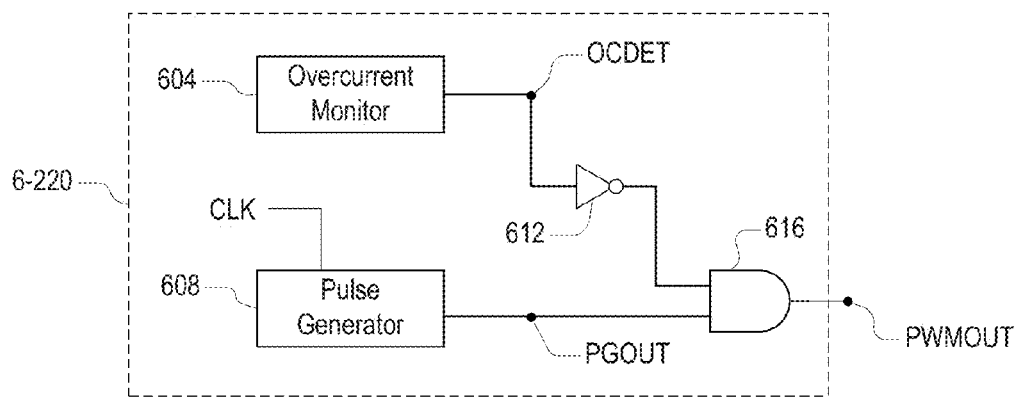
FIG. 6 is a schematic of a PWM controller according to an embodiment of the disclosure.

FIG. 6 is a schematic a PWM controller 6-220 according to an embodiment of the present disclosure. The PWM controller 6-220 may be used in the switching regulator 2-100 and includes an overcurrent monitor 604 and a pulse generator 608.

The overcurrent monitor 604 detects or predicts an overcurrent and produces an overcurrent detect signal OCDET that is a logic 1 when the overcurrent is detected or predicted, and a logic 0 otherwise. In another implementation, the overcurrent monitor 604 may use logic 0 to indicate the detection or prediction of overcurrent and a logic 1 otherwise. The overcurrent monitor 604 may detect or predict overcurrents by using one or more of an output voltage, a current sense voltage, a current through a switching device, a time since startup began, or a duration of a pulse generated by pulse generator 608.

The pulse generator 608 generates a pulse on pulse signal PGOUT during every cycle of a clock CLK according to an implementation.

An inverter 612 and an AND gate 616 combine the overcurrent detect signal OCDET and the pulse signal PGOUT to produce the output signal PWMOUT of PWM controller 6-220.

Figure 7:
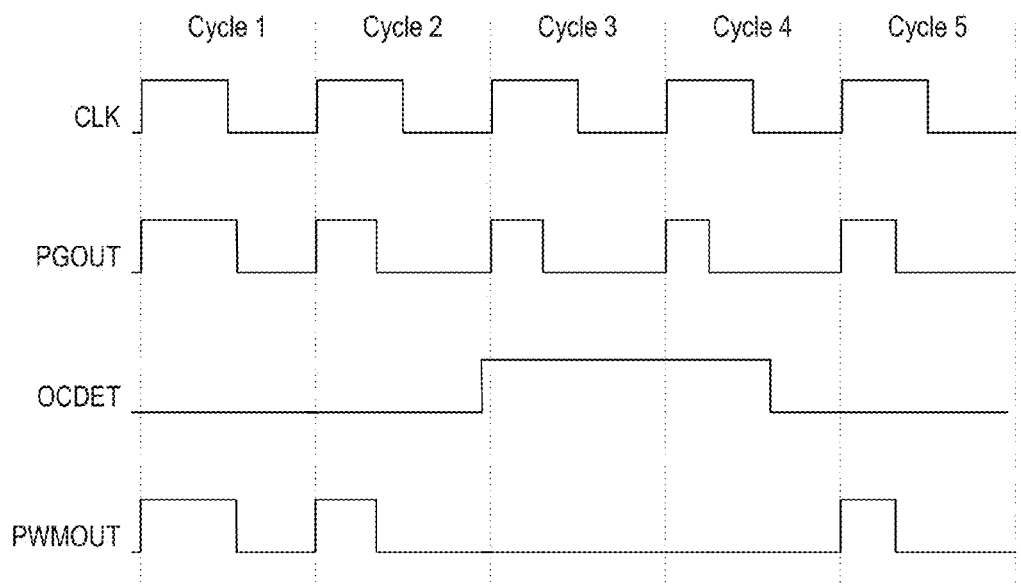
FIG. 7 is waveforms showing operation of the PWM controller of FIG. 6.

FIG. 7 is a waveform diagram showing an operation of PWM controller 6-220 according to an embodiment. In each clock cycle, pulse generator 608 generates a pulse on a pulse signal PGOUT.

In clock cycles 1, 2, and 5, the overcurrent monitor 604 does not detect or predict an overcurrent, and therefore outputs a logic 0 on the overcurrent detect signal OCDET. When the overcurrent detect signal OCDET is a logic 0, the pulse on the pulse signal PGOUT is output on the PWM controller output PWMOUT.

In clock cycles 3 and 4, the overcurrent monitor 604 detects or predicts an overcurrent, and therefore outputs a logic 1 on the overcurrent detect signal OCDET. When the overcurrent detect signal OCDET is a logic 1, the pulse on the pulse signal PGOUT is not output on the PWM controller output PWMOUT, that is, the pulse is skipped.

Figure 8:
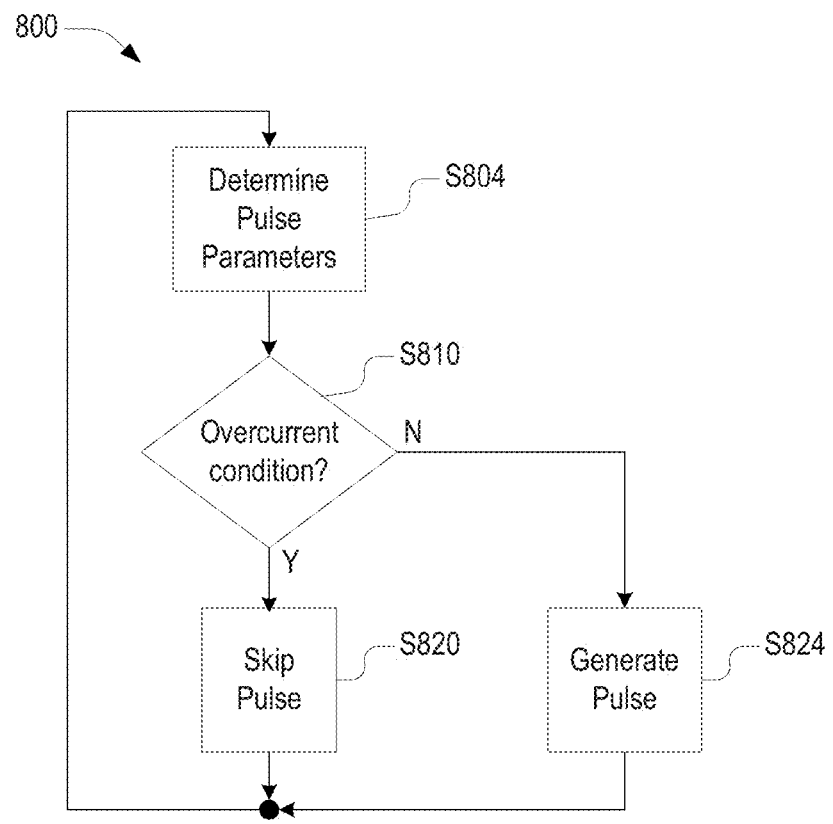
FIG. 8 is a flow diagram of a method of reducing overcurrents according to an embodiment of the disclosure.
Figure 9:
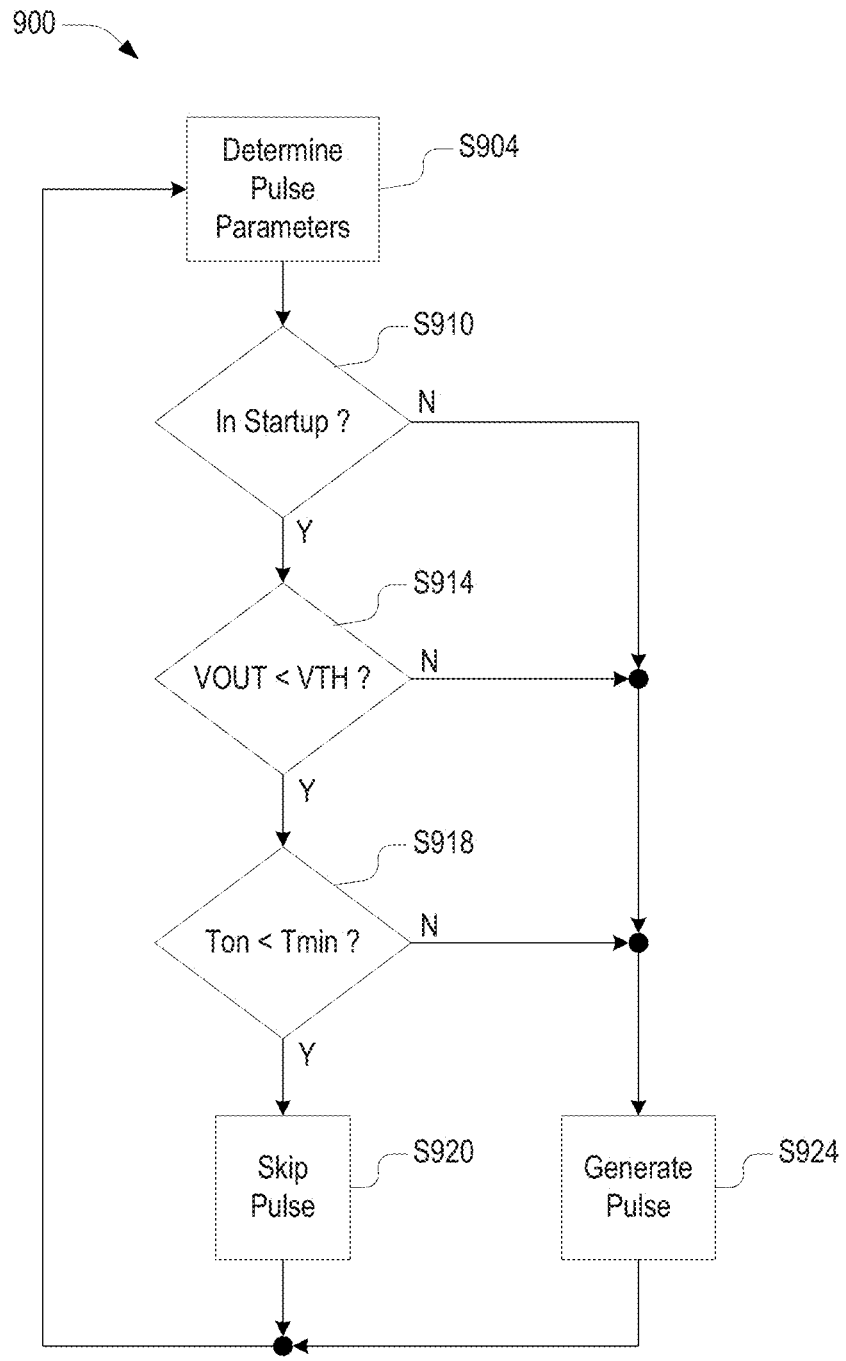
FIG. 9 is a flow diagram of a method of reducing overcurrents according to an embodiment of the disclosure.

FIGS. 8 and 9 are flow diagrams of methods in accordance with an embodiment of the disclosure. Although the operations performed by the method are shown in a particular order, a person of ordinary skill in the art would understand based on the disclosure and teachings provided herein that some of the operations shown could be reordered or omitted.

FIG. 8 is a flow diagram of a method 800 of reducing overcurrent in a switched circuit in accordance with an embodiment of the disclosure. The method 800 can be used in switched power supplies, power converters, and power regulators that use inductors for energy storage, including AC-DC flyback regulators, DC-DC flyback regulators, DC-DC buck converters, DC-DC boost converters, DC-DC buck-boost converters, and the like.

At S804, the parameters of a charging pulse for a power-storage inductor are determined. This may include determining a duration (i.e., an on-time Ton) of the charging pulse.

At S810, whether an overcurrent will occur is determined or predicted. The detection or prediction of overcurrents may use one or more of an output voltage, a current sense voltage corresponding to a core current in an energy storage inductor, a time since a startup operation began, the duration of the charging pulse, and information about the design of the circuit.

When an overcurrent is detected or predicted at S810, at S820 the charging pulse is skipped. When an overcurrent is not detected or predicted at S810, at S824 the charging pulse is generated to charge the energy storage inductor. Operation of the method then resumes at S804.

FIG. 9 is a flow diagram of a method 900 of reducing overcurrent in a switched circuit in accordance with an embodiment of the disclosure. The method 900 can be used in switched power supplies, power converters, and power regulators that use inductors for energy storage, including AC-DC flyback regulators, DC-DC flyback regulators, DC-DC buck converters, DC-DC boost converters, and DC-DC buck-boost converters, and the like.

At S904, the parameters of a charging pulse for a power-storage inductor are determined. This may include determining a duration (i.e., an on-time Ton) of the charging pulse.

At S910, whether the regulator is in a startup mode is determined. Determining whether the regulator is in the startup mode may be performed using one or more of a time from a clock circuit, a count of charging cycles, or a measurement of an output voltage VOUT. If the regulator is determined to be in the startup mode the method proceeds to S914, otherwise the method proceeds to S924.

In an embodiment, determining whether the regulator is in the startup mode may be based on the time since the regulator began operation or was reset. For example, determining whether the regulator is in the startup mode may be performed by determining whether a counter counting clock cycles is less than a predetermined value, or by monitoring a voltage in a circuit in which a capacitor is charged and/or discharged through a resistor, i.e., an RC timer circuit.

In an embodiment, whether or not the regulator is in the startup mode the regulator may be determined by determining whether the output voltage VOUT is less than a predetermined value. In an embodiment, a device external to the regulator may transmit a signal indicating whether the regulator is in startup mode to the regulator.

At S914, whether or not the output voltage VOUT of the regulator is greater than an output threshold voltage VTH is determined. The output threshold voltage VTH may be threshold Vo according to Equation 5, threshold Vo being the output voltage at which the charged current and discharged current of the inductor are equal during a cycle. If the output voltage VOUT is less than the output threshold voltage VTH, the method proceeds to S918, otherwise the method proceeds to S924.

At S918, the duration Ton (i.e., the on-time) of the charging pulse is compared to a minimum time Tmin. For example, in a regulator with a cycle rate of 125 KHz, the minimum time Tmin may be 800 nanoseconds. If the duration Ton of the charging pulse is less than the minimum time Tmin the method proceeds to S920, otherwise the method proceeds to S924.

At S920, the charging pulse is skipped. That is, the charging pulse that would normally have been generated during the present cycle is not generated in order to reduce overcurrent. Accordingly, the power-storage inductor is not charged during the cycle.

At S924, the charging pulse is generated, and the power-storage inductor is charged during the cycle.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A power supply apparatus, comprising:
an inductor configured to store and discharge energy;
a pulse generator configured to generate a plurality of pulses; and
a circuit configured to determine a plurality of overcurrent detect signals for the plurality of pulses, respectively, generate a charging pulse for each of the plurality of pulses when the respective overcurrent detect signal has a first value, skip generation of the respective charging pulse for each of the plurality of pulses when the respective overcurrent detect signal has a second value, and charge the inductor using the generated charging pulses,
wherein the second value indicates a detection or prediction of an overcurrent associated with the inductor, and the first value indicates a detection or prediction of an absence of the overcurrent,
wherein the circuit is configured to skip generation of the respective charging pulse for each of the plurality of pulses when the circuit is in a startup period, wherein the circuit being in the startup period is determined using an output voltage of the power supply apparatus, a resistor-capacitor (RC) circuit, or a cycle count of the charging pulses, and
wherein the output voltage is compared to a threshold voltage Vo, and $$Vo = \frac{Vin \cdot Ton}{N \cdot (Tcyc - Ton)}$$

wherein Vin is a voltage applied to the inductor during charging, Ton is a duration of the skipped charging pulse, N is a turns ratio of a primary winding of the inductor to a secondary winding of the inductor, and Tcyc is an interval between charging pulses.

2. The apparatus of claim 1, further comprising:
a switch coupled to the inductor and configured to receive the charging pulses,
wherein the pulse generator is a pulse width modulator (PWM) controller.

3. The apparatus of claim 1, wherein the circuit is configured to skip generation of the respective charging pulse according to a duration of each of the plurality of pulses.

4. The apparatus of claim 1, wherein the circuit is adapted to reduce overcurrent by skipping generation of another charging pulse subsequent to the skipping generation of a first charging pulse.

5. A method, comprising:
generating a plurality of pulses;
determining a plurality of overcurrent detect signals for the plurality of pulses, respectively;
generating a plurality of charging pulses according to the plurality of pulses and the plurality of overcurrent detect signals, respectively; and
charging an inductor of a power supply apparatus with energy by applying the plurality of charging pulses to the inductor,
wherein generating the plurality of charging pulses includes skipping generation of a charging pulse when a respective overcurrent detect signal of a respective pulse indicates the detection or prediction of an overcurrent associated with the inductor,
wherein generating the plurality of charging pulses includes skipping the charging pulse according to an output voltage of the power supply apparatus, and further comprising
comparing the output voltage to a threshold voltage Vo, and $$Vo = \frac{Vin \cdot Ton}{N \cdot (Tcyc - Ton)}$$

wherein Vin is a voltage applied to the inductor during charging, Ton is a duration of the skipped charging pulse, N is the turns ratio of a primary winding of the inductor to a secondary winding of the inductor, and Tcyc is an interval between charging pulses.

6. The method of claim 5, wherein the plurality of charging pulses are applied to a control terminal of a switch coupled to the inductor to charge the inductor.

7. The method of claim 5, wherein generating the plurality of charging pulses includes skipping generation of the charging pulse when the respective overcurrent detect signal of the respective pulse indicates the detection or prediction of the overcurrent during a startup period.

8. The method of claim 7, further comprising determining the startup period using a cycle count of the charging pulse, an output voltage of the power supply apparatus, or an RC circuit.

9. The method of claim 5, wherein generating the plurality of charging pulses includes skipping the charging pulse based on a duration of the respective charging pulse.

10. The method of claim 5, further comprising skipping generation of another charging pulse subsequent to the skipping generation of a previous charging pulse.

11. A power supply apparatus, comprising:
an inductor configured to store and discharge energy;
a pulse generator configured to generate a plurality of pulses; and
a circuit configured to determine a plurality of overcurrent detect signals for the plurality of pulses, respectively, generate a charging pulse for each of the plurality of pulses when the respective overcurrent detect signal has a first value, skip generation of the respective charging pulse for each of the plurality of pulses when the respective overcurrent detect signal has a second value, and charge the inductor using the generated charging pulses,
wherein the second value indicates a detection or prediction of an overcurrent associated with the inductor, and the first value indicates a detection or prediction of an absence of the overcurrent,
wherein the circuit is configured to skip generation of the respective charging pulse for each of the plurality of pulses when the circuit is in a startup period, wherein the circuit being in the startup period is determined using an output voltage of the power supply apparatus, a resistor capacitor (RC) circuit, or a cycle count of the charging pulses, and
wherein the output voltage is compared to a threshold voltage Vo, and $$Vo = \frac{Vin \cdot Ton}{N \cdot (Tcyc - Ton)} - V_d$$

wherein Vin is a voltage applied to the inductor during charging, Ton is a duration of the skipped charging pulse, N is a turns ratio of a primary winding of the inductor to a secondary winding of the inductor, Tcyc is an interval between charging pulses, and $V_d$ is a forward voltage of a diode coupled to the inductor.

12. The apparatus of claim 11, further comprising:
a switch coupled to the inductor and configured to receive the charging pulses,
wherein the pulse generator is a pulse width modulator (PWM) controller.

13. The apparatus of claim 11, wherein the circuit is configured to skip generation of the respective charging pulse according to a duration of each of the plurality of pulses.

14. The apparatus of claim 11, wherein the circuit is adapted to reduce overcurrent by skipping generation of another charging pulse subsequent to the skipping generation of a first charging pulse.

* * * * *